United States Patent
Lin et al.

(10) Patent No.: US 8,422,181 B2
(45) Date of Patent: Apr. 16, 2013

(54) ELECTROSTATIC DISCHARGE PROTECTION DEVICE OF AN ELECTRIC APPARATUS

(75) Inventors: Chih-Chiang Lin, Taichung (TW); Lin Lin, Taichung (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 420 days.

(21) Appl. No.: 12/913,769

(22) Filed: Oct. 28, 2010

(65) Prior Publication Data

US 2011/0122537 A1  May 26, 2011

(30) Foreign Application Priority Data

Nov. 24, 2009  (TW) ................ 98140004 A

(51) Int. Cl.
*H02H 9/00* (2006.01)
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl.
USPC .......................................... 361/56; 361/118

(58) Field of Classification Search .................. 361/56
See application file for complete search history.

(56) References Cited

U.S. PATENT DOCUMENTS

| | | | | |
|---|---|---|---|---|
| 6,157,203 A * | 12/2000 | Takahashi | ................ | 326/21 |
| 6,724,226 B2 * | 4/2004 | Kim | ................ | 327/108 |
| 7,728,566 B2 * | 6/2010 | Negoro et al. | ................ | 323/270 |
| 7,978,454 B1 * | 7/2011 | Pasqualini | ................ | 361/111 |
| 2007/0297105 A1 * | 12/2007 | Brennan et al. | ................ | 361/56 |
| 2012/0019969 A1 * | 1/2012 | Iwabuchi | ................ | 361/56 |
| 2012/0074926 A1 * | 3/2012 | Sugiyama et al. | ................ | 324/76.11 |
| 2012/0306540 A1 * | 12/2012 | Komatsu et al. | ................ | 327/77 |

* cited by examiner

*Primary Examiner* — Dharti Patel
(74) *Attorney, Agent, or Firm* — Jianq Chyun IP Office

(57) ABSTRACT

An electronic apparatus including an electrostatic discharge (ESD) protection circuit, an abnormal voltage detection circuit, an internal circuit and a blocking circuit is provided. The ESD protection circuit receives a plurality of input signals for preventing an abnormal high voltage damage produced by an ESD phenomenon on a path for delivering the input signals, and correspondingly outputs a plurality of voltage-dropped input signals. The input signals include a control signal set and a data signal set. The abnormal voltage detection circuit is coupled to the ESD protection circuit. The abnormal voltage detection circuit receives the voltage-dropped input signals, and produces a blocking control signal according to voltage levels of the voltage-dropped input signals. The blocking circuit is used for receiving the blocking control signal and blocking the control signal set from delivering to the internal circuit according to the blocking control signal.

12 Claims, 2 Drawing Sheets

ELECTROSTATIC DISCHARGE PROTECTION DEVICE OF AN ELECTRIC APPARATUS

CROSS-REFERENCE TO RELATED APPLICATION

This application claims the priority benefit of Taiwan application serial no. 98140004, filed on Nov. 24, 2009. The entirety of the above-mentioned patent application is hereby incorporated by reference herein and made a part of this specification.

BACKGROUND

1. Technical Field

The present disclosure relates to an electronic apparatus. More particularly, the present disclosure relates to an electrostatic discharge (ESD) protection device of an electronic apparatus.

2. Description of Related Art

In an actual application environment, electronic products are probably subjected to the impacts of electrostatic discharges (ESD). Generally, an ESD voltage is far greater than a general power voltage, and the ESD can be roughly divided into a human-body model (HBM), a machine model (MM) and a charge-device model (CDM) according to different voltage degrees generated by the ESD. However, regardless of the ESD model, devices are probably damaged when the ESD is occurred, so that some ESD protection measures have to be configured in a circuit to effectively blocking an ESD current, so as to avoid device damage.

SUMMARY

The present disclosure is directed to an electronic apparatus, which can effectively block abnormal data from writing into an internal circuit of the electronic apparatus when an electrostatic discharge (ESD) phenomenon is occurred, so as to avoid false operation of the electronic apparatus.

The present disclosure provides an electronic apparatus including an ESD protection circuit, an abnormal voltage detection circuit, an internal circuit and a blocking circuit. The ESD protection circuit receives a plurality of input signals for preventing an abnormal high voltage damage produced by an ESD phenomenon on a path for delivering the input signals, and correspondingly outputs a plurality of voltage-dropped input signals. The input signals include a control signal set and a data signal set. The abnormal voltage detection circuit is coupled to the ESD protection circuit. The abnormal voltage detection circuit receives the voltage-dropped input signals, and produces a blocking control signal according to voltage levels of the voltage-dropped input signals. The blocking circuit is coupled between the abnormal voltage detection circuit and the internal circuit, and is used for receiving the blocking control signal and blocking the control signal set from transmitting to the internal circuit according to the blocking control signal.

In an exemplary embodiment of the present disclosure, the abnormal voltage detection circuit compares the voltage levels of the voltage-dropped input signals with a threshold voltage to generate the blocking control signal.

In an exemplary embodiment of the present disclosure, the abnormal voltage detection circuit enables the blocking control signal when detecting that at least one of the voltage levels of the voltage-dropped input signals is greater than the threshold voltage. In an exemplary embodiment of the present disclosure, the blocking circuit blocks the control signal set from transmitting to the internal circuit when the blocking control signal is enabled.

In an exemplary embodiment of the present disclosure, the abnormal voltage detection circuit disables the blocking control signal when detecting that all of the voltage levels of the voltage-dropped input signals are smaller than or equal to the threshold voltage. In an exemplary embodiment, the blocking circuit transmits the control signal set to the internal circuit when the blocking control signal is disabled.

In an exemplary embodiment of the present disclosure, the blocking circuit includes at least one switch. The switch is coupled between a terminal of the abnormal voltage detection circuit correspondingly transmitting the control signal set and the internal circuit, and the switch is turned off according to the blocking control signal, so as to block the control signal set from transmitting to the internal circuit.

In an exemplary embodiment of the present disclosure, the control signal set is used for controlling writing the data signal set into the internal circuit.

In an exemplary embodiment of the present disclosure, the ESD protection circuit includes a plurality of ESD protection units and a power clamp circuit, wherein each of the ESD protection units includes a first diode and a second diode. An anode of the first diode is coupled to a system voltage, and a cathode of the first diode receives one of the input signals. An anode of the second diode is coupled to the cathode of the first diode, and a cathode of the second diode is coupled to a ground voltage. The power clamp circuit coupled to the anode of the first diode and the cathode of the second diode.

In an exemplary embodiment of the present disclosure, the internal circuit includes at least one of a register set and a memory.

In an exemplary embodiment of the present disclosure, the ESD protection circuit, the abnormal voltage detection circuit, the blocking circuit and the internal circuit are all built on a same chip.

In an exemplary embodiment of the present disclosure, the ESD protection circuit, the abnormal voltage detection circuit and the blocking circuit are built on a first chip, and the internal circuit is built on a second chip other than the first chip.

According to the above descriptions, in the present disclosure, the abnormal voltage detection circuit is added to a conventional ESD protection circuit to detect whether the voltage levels of the voltage-dropped input signals processed by the ESD protection circuit are abnormal, and the input signals are blocked or transmitted to the internal circuit according to a detecting result. Therefore, the input signals are effectively blocked from writing incorrect data into the internal circuit due to the ESD phenomenon, so as to avoid the false operation of the electronic apparatus, and improve a whole performance of the electronic apparatus.

In order to make the aforementioned and other features and advantages of the present disclosure comprehensible, several exemplary embodiments accompanied with figures are described in detail below.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EXEMPLARY EMBODIMENTS

Figure 1:
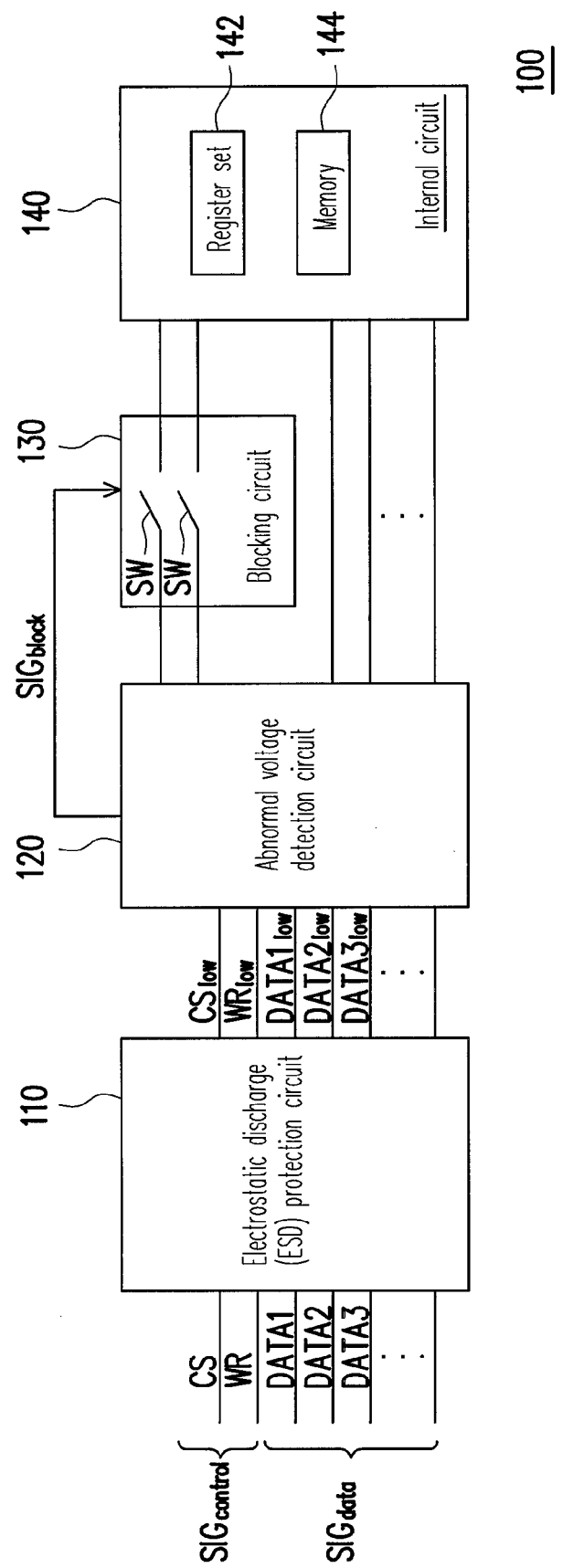
FIG. 1 is a block schematic diagram illustrating an electronic apparatus according to an exemplary embodiment of the present disclosure.

FIG. 1 is a block schematic diagram illustrating an electronic apparatus according to an exemplary embodiment of the present disclosure. Referring to FIG. 1, the electronic apparatus 100 of the present disclosure includes an electrostatic discharge (ESD) protection circuit 110, an abnormal voltage detection circuit 120, a blocking circuit 130 and an internal circuit 140. The abnormal voltage detection circuit 120 is coupled to the ESD protection circuit 110, and the blocking circuit 130 is coupled between the abnormal voltage detection circuit 120 and the internal circuit 140. In an actual application, the internal circuit 140 may include at least one of a register set 142 and a memory 144.

The ESD protection circuit 110 of the present exemplary embodiment receives a plurality of input signals CS, WR, DATA1, DATA2, DATA3, . . . , wherein the input signals CS, WR, DATA1, DATA2, DATA3, . . . can be divided into two signal sets of a control signal set $SIG_{control}$ and a data signal set $SIG_{data}$. In the present exemplary embodiment, the control signal set $SIG_{control}$ includes the input signals CS and WR, and the data signal set $SIG_{data}$ includes the input signals DATA1, DATA2, DATA3, . . . , wherein the control signal set $SIG_{control}$ can be used to control writing the data signal set into the internal circuit.

In the present exemplary embodiment, after receiving the input signals CS, WR, DATA1, DATA2, DATA3, . . . , the ESD protection circuit 110 can correspondingly output a plurality of voltage-dropped input signals $CS_{low}$, $WR_{low}$, $DATA1_{low}$, $DATA2_{low}$, $DATA3_{low}$, . . . . In this way, the ESD protection circuit 110 can be used to reduce an abnormal high voltage produced by an ESD phenomenon on a path for delivering the input signals CS, WR, DATA1, DATA2, DATA3, . . . .

Figure 2:
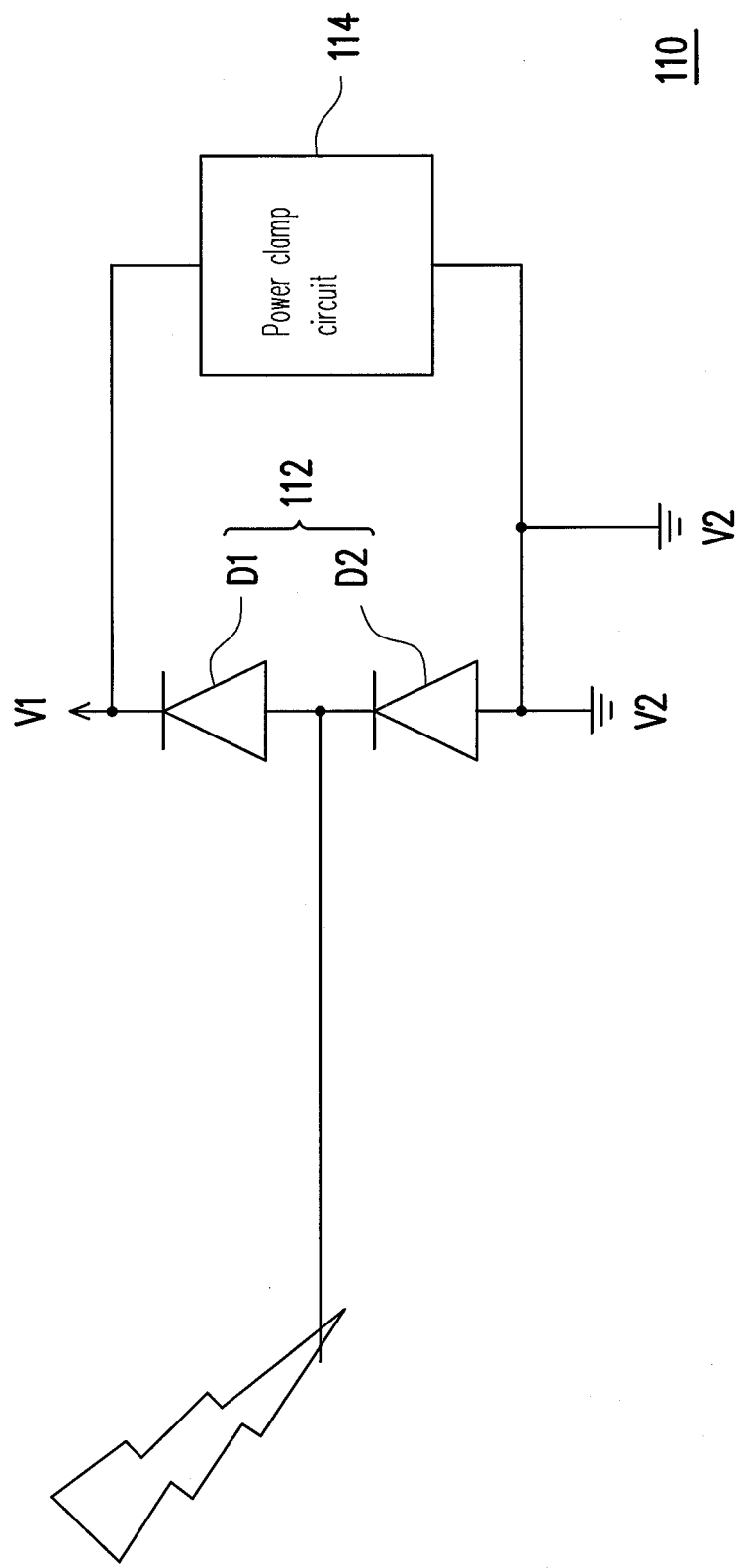
FIG. 2 is a block schematic diagram illustrating an electrostatic discharge (ESD) protection circuit according to an exemplary embodiment of the present disclosure.

It should be noticed that the ESD protection circuit 110 of the present exemplary embodiment is, for example, formed by a plurality of ESD protection units 112 and a power clamp circuit 114, as that shown in FIG. 2, though the present disclosure is not limited thereto. The power clamp circuit 114 is coupled to the anode of the diode D1 and the cathode of the diode D2, and each of the ESD protection units 112 includes a diode D1 and a diode D2. An anode of the diode D1 is coupled to the system voltage V1, and a cathode thereof receives one of the input signals CS, WR, DATA1, DATA2, DATA3, . . . . An anode of the diode D2 is coupled to the cathode of the diode D1, and a cathode thereof is coupled to the ground voltage V2.

In the present exemplary embodiment, the abnormal voltage detection circuit 120 receives the voltage-dropped input signals $CS_{low}$, $WR_{low}$, $DATA1_{low}$, $DATA2_{low}$, $DATA3_{low}$, . . . , and generates a blocking control signal $SIG_{block}$ according to voltage levels of the voltage-dropped input signals $CS_{low}$, $WR_{low}$, $DATA1_{low}$, $DATA2_{low}$, $DATA3_{low}$, . . . . For example, the abnormal voltage detection circuit 120 can compare the voltage levels of the voltage-dropped input signals $CS_{low}$, $WR_{low}$, DATA1 $DATA2_{low}$, $DATA3_{low}$, . . . with a threshold voltage to generate the blocking control signal $SIG_{block}$.

In the present exemplary embodiment, the blocking circuit 130 receives the blocking control signal $SIG_{block}$, and the blocking circuit 130 can block the control signal set $SIG_{control}$ from transmitting to the internal circuit 140 according to the blocking control signal $SIG_{block}$. In an actual application, the blocking circuit 130 includes at least one switch SW, and the switch SW is coupled between a terminal of the abnormal voltage detection circuit 120 correspondingly transmitting the control signal set $SIG_{control}$ and the internal circuit 140.

Accordingly, the abnormal voltage detection circuit 120 enables the blocking control signal $SIG_{block}$ when detecting that at least one of the voltage levels of the voltage-dropped input signals $CS_{low}$, $WR_{low}$, $DATA1_{low}$, $DATA2_{low}$, $DATA3_{low}$, . . . is greater than the threshold voltage. In the present exemplary embodiment, when the blocking control signal $SIG_{block}$ is enabled, the switch SW of the blocking circuit 130 is turned off to block the control signal set $SIG_{control}$ from transmitting to the internal circuit 140.

Conversely, the abnormal voltage detection circuit 120 disables the blocking control signal $SIG_{block}$ when detecting that all of the voltage levels of the voltage-dropped input signals $CS_{low}$, $WR_{low}$, $DATA1_{low}$, $DATA2_{low}$, $DATA3_{low}$, . . . are smaller than or equal to the threshold voltage. In an exemplary embodiment, when the blocking control signal $SIG_{block}$ is disabled, the switch SW of the blocking circuit 130 is turned on to transmit the control signal set $SIG_{control}$ to the internal circuit 140.

According to the above descriptions, it is known that by using the abnormal voltage detection circuit 120, the voltage levels of the voltage-dropped input signals $CS_{low}$, $WR_{low}$, $DATA1_{low}$, $DATA2_{low}$, $DATA3_{low}$, . . . output from the ESD protection circuit 110 can be detected, and the input signals CS, WR, DATA1, DATA2, DATA3, . . . are blocked or transmitted to the internal circuit 140 according to a detecting result, so as to effectively prevent the input signals from writing incorrect data into the internal circuit 140 due to the ESD phenomenon.

It should be noticed that in an actual application, the ESD protection circuit 110, the abnormal voltage detection circuit 120, and the blocking circuit 130 can be built on a same chip, and the internal circuit 140 is built on another chip. For example, the internal circuit 140 is disposed on a certain chip of a display panel (not shown), and the ESD protection circuit 110, the abnormal voltage detection circuit 120, and the blocking circuit 130 are disposed outside the display panel. Alternatively, the ESD protection circuit 110, the abnormal voltage detection circuit 120, the blocking circuit 130 and the internal circuit 140 can be all built on a same chip, for example, the ESD protection circuit 110, the abnormal voltage detection circuit 120, the blocking circuit 130 and the internal circuit 140 are all disposed on a certain chip of the display panel.

In summary, in the electronic apparatus of the present disclosure, the abnormal voltage detection circuit is configured to detect whether the voltage levels of the voltage-dropped input signals processed by the ESD protection circuit are abnormal. Moreover, the abnormal voltage detection circuit further blocks the input signals from transmitting to the internal circuit or transmits the input signals to the internal circuit according to a detecting result. In this way, a problem that the input signals write incorrect data into the internal circuit due to the ESD phenomenon can be resolved. Therefore, the false operation of the electronic apparatus generated due to the ESD phenomenon can be avoided, so that a whole performance of the electronic apparatus is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An electronic apparatus, comprising:
an electrostatic discharge (ESD) protection circuit, for receiving a plurality of input signals to reduce an abnormal high voltage produced by an ESD phenomenon on a path for delivering the input signals, and correspondingly outputting a plurality of voltage-dropped input signals, wherein the input signals comprise a control signal set and a data signal set;
an abnormal voltage detection circuit, coupled to the ESD protection circuit, for receiving the voltage-dropped input signals, and producing a blocking control signal according to voltage levels of the voltage-dropped input signals;
an internal circuit; and
a blocking circuit, coupled between the abnormal voltage detection circuit and the internal circuit, for receiving the blocking control signal and blocking the control signal set from transmitting to the internal circuit according to the blocking control signal.

2. The electronic apparatus as claimed in claim 1, wherein the abnormal voltage detection circuit compares the voltage levels of the voltage-dropped input signals with a threshold voltage to generate the blocking control signal.

3. The electronic apparatus as claimed in claim 2, wherein the abnormal voltage detection circuit enables the blocking control signal when detecting that at least one of the voltage levels of the voltage-dropped input signals is greater than the threshold voltage.

4. The electronic apparatus as claimed in claim 3, wherein the blocking circuit blocks the control signal set from transmitting to the internal circuit when the blocking control signal is enabled.

5. The electronic apparatus as claimed in claim 2, wherein the abnormal voltage detection circuit disables the blocking control signal when detecting that all of the voltage levels of the voltage-dropped input signals are smaller than or equal to the threshold voltage.

6. The electronic apparatus as claimed in claim 5, wherein the blocking circuit transmits the control signal set to the internal circuit when the blocking control signal is disabled.

7. The electronic apparatus as claimed in claim 1, wherein the blocking circuit comprises:
at least one switch, coupled between a terminal of the abnormal voltage detection circuit correspondingly transmitting the control signal set and the internal circuit, for being turned off according to the blocking control signal to block the control signal set from transmitting to the internal circuit.

8. The electronic apparatus as claimed in claim 1, wherein the control signal set is used for controlling writing the data signal set into the internal circuit.

9. The electronic apparatus as claimed in claim 1, wherein the ESD protection circuit comprises:
a plurality of ESD protection units, and each of the ESD protection units comprising:
a first diode, having an anode coupled to a system voltage, and a cathode receiving one of the input signals; and
a second diode, having an anode coupled to the cathode of the first diode, and a cathode coupled to a ground voltage; and
a power clamp circuit, coupled to the anode of the first diode and the cathode of the second diode.

10. The electronic apparatus as claimed in claim 1, wherein the internal circuit comprises at least one of a register set and a memory.

11. The electronic apparatus as claimed in claim 1, wherein the ESD protection circuit, the abnormal voltage detection circuit, the blocking circuit and the internal circuit are all built on a same chip.

12. The electronic apparatus as claimed in claim 1, wherein the ESD protection circuit, the abnormal voltage detection circuit and the blocking circuit are built on a first chip, and the internal circuit is built on a second chip other than the first chip.

* * * * *